(12) United States Patent
Natolino

(10) Patent No.: US 9,374,937 B2
(45) Date of Patent: Jun. 28, 2016

(54) HAND SHOVEL INCLUDING A SHOVEL AND A HANDLE HAVING A SLIGHTLY V-SHAPED ARRANGEMENT

(71) Applicant: Andreas Hinrich Natolino, Vira Gambarogno (CH)

(72) Inventor: Andreas Hinrich Natolino, Vira Gambarogno (CH)

(*) Notice: Subject to any disclaimer, the term of this patent is extended or adjusted under 35 U.S.C. 154(b) by 0 days.

(21) Appl. No.: 14/406,738

(22) PCT Filed: Jun. 6, 2013

(86) PCT No.: PCT/EP2013/061713
§ 371 (c)(1),
(2) Date: Dec. 9, 2014

(87) PCT Pub. No.: WO2013/186117
PCT Pub. Date: Dec. 19, 2013

(65) Prior Publication Data
US 2015/0150182 A1    Jun. 4, 2015

(30) Foreign Application Priority Data

Jun. 12, 2012   (CH) ......................................... 823/12

(51) Int. Cl.
| | | |
|---|---|---|
| *A01K 29/00* | (2006.01) | |
| *E01H 1/12* | (2006.01) | |
| *A01B 1/02* | (2006.01) | |
| *A01B 1/04* | (2006.01) | |

(52) U.S. Cl.
CPC .... *A01B 1/02* (2013.01); *A01B 1/04* (2013.01)

(58) Field of Classification Search
USPC ...................... 294/176–181, 1.3, 1.4, 1.5, 50; 172/372, 381; 209/417, 418, 419; 56/400.11, 400.12, 400.21
See application file for complete search history.

(56) References Cited

U.S. PATENT DOCUMENTS

| | | | | |
|---|---|---|---|---|
| 237,387 | A | * | 2/1881 | Kerfoot .......................... 294/176 |
| 1,109,469 | A | | 9/1914 | Sandberg |
| 2,318,277 | A | | 5/1943 | Yensen |
| D137,440 | S | * | 3/1944 | Long ............................... D7/691 |
| 2,511,560 | A | * | 6/1950 | Bechmann ..................... 239/652 |
| 3,369,834 | A | * | 2/1968 | Miles ............................. 111/101 |
| 3,937,512 | A | * | 2/1976 | Baughman ..................... 294/104 |
| D245,471 | S | * | 8/1977 | MacInnis et al. .............. D7/691 |
| D267,357 | S | * | 12/1982 | Hillstrom ....................... 294/176 |
| 4,424,997 | A | * | 1/1984 | Jackson ........................ 294/53.5 |
| D296,406 | S | * | 6/1988 | Fuller ............................ D7/691 |

(Continued)

FOREIGN PATENT DOCUMENTS

| | | |
|---|---|---|
| DE | 3104446 | 10/1982 |
| DE | 8805417 | 6/1988 |

(Continued)

OTHER PUBLICATIONS

International Search Report from International Application No. PCT/EP2013/061713 mailed Sep. 5, 2013.

*Primary Examiner* — Paul T Chin
(74) *Attorney, Agent, or Firm* — Dorsey & Whitney LLP

(57) ABSTRACT

In an embodiment, a hand digging shovel includes a handle and a shovel. The hand digging shovel is configured for use in gardens and the like and is intended to permit both low-fatigue working with minimized excavation and also use in tight spaces. These problems are solved by a slightly V-shaped arrangement of handle and shovel relative to one another, wherein said handle and shovel are connected together by means of an arm.

6 Claims, 2 Drawing Sheets

(56) References Cited

U.S. PATENT DOCUMENTS

Figure 1:
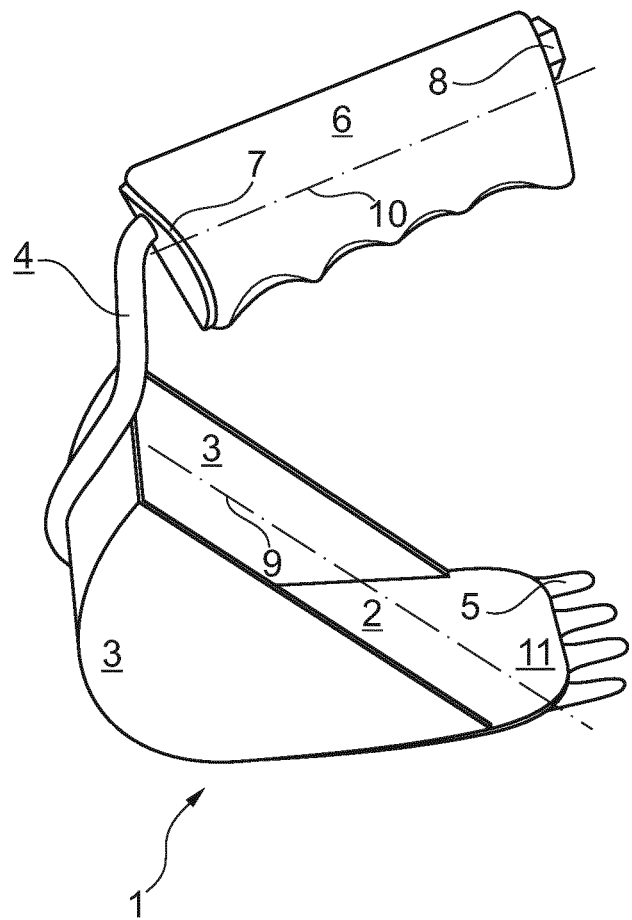

| | | | |
|---|---|---|---|
| D362,161 S * | 9/1995 | Rosenkranz | D7/691 |
| 8,955,893 B1 * | 2/2015 | Stern et al. | 294/1.4 |
| 2003/0067181 A1 * | 4/2003 | Bailey | 294/49 |
| 2005/0029825 A1 | 2/2005 | Heneveld, Sr. | |
| 2008/0143128 A1 * | 6/2008 | Kuhns et al. | 294/51 |
| 2014/0070556 A1 * | 3/2014 | Price | 294/50.6 |

FOREIGN PATENT DOCUMENTS

| | | |
|---|---|---|
| DE | 202008007479 | 9/2008 |
| DE | 202010011607 | 12/2010 |
| WO | WO 99/49718 | 10/1999 |

\* cited by examiner

HAND SHOVEL INCLUDING A SHOVEL AND A HANDLE HAVING A SLIGHTLY V-SHAPED ARRANGEMENT

The invention relates to a hand digging shovel, particularly for use in gardens, in the construction industry and the like.

Hand shovels for use in green spaces and gardens as well as in private gardens are largely known.

DE-U-8805417 shows a hand shovel for collecting garbage or loose material with a delta-shaped shovel or bucket plate and a corresponding wide shovel or bucket opening. To this end an essentially triangular cut out element of flat metallic material is correspondingly shaped by bending only, so that the shovel or bucket and the polygonal handle form a single unit.

According to DE-U-202010011607, a shovel comprises a shovel or bucket plate and a receiving bushing for the shovel arm, wherein the bucket plate has a straight bucket plate edge and is provided with an U-shaped bend in the edge. On both sides of the shovel arm, a tread border extends parallel to the bucket plate edge. The bucket plate has a planar form in the area of the bucket plate edge. A curved area follows in the direction towards the receiving bushing, wherein the curvature extends in a longitudinal and transversal direction with respect to the direction of the stroke. The flanks of the bended part are not curved.

A manual digging apparatus according to DE-U-202008007479 comprises a handle element with a first and a second end as well as digging means, which are rigidly fixed to the first end. The digging means are provided as a shovel or hacking plate.

According to the above identified prior art, the shovel arm or shovel handle is connected to the shovel plate in the longitudinal direction and the main axis of the shovel plate, in working conditions, extends at least substantially parallel to the longitudinal axis of the handle or shovel arm, which requires a free working space, which has to be greater than the length of the handle or shovel arm. The use of shovels within smaller working spaces or free spaces is correspondingly limited.

The aim of the invention is that of overcoming the above identified drawbacks affecting the state of the art, and providing a hand digging shovel, in particular for use in gardens or the like, which allows both low fatigue working with minimized excavation and use in tight spaces, for instance inside flower vases, small tubs and bags.

This objective is obtained by means of the features recited in claim 1.

The hand digging shovel according to the present invention comprises a shovel or bucket connected to an arm and a handle provided on the arm, wherein handle and bucket have a slightly V-shaped reciprocal disposition (arrangement to each other). The bucket's shape is similar to that of an excavator bucket.

Advantageous embodiments are disclosed in the dependent claims.

The surface of the bucket is curved (i.e. it has an SD-curvature (eggshell effect)), whereas it comprises a substantially straight end portion towards the exit or opening.

The side walls of the bucket are approximately perpendicular to the bucket surface and are shorter than the bucket surface, so that their end portion define a protrusion. The bucket surface may be slightly curved or planar towards the side walls.

Bucket and arm are preferably made of steel and at least in the area of the protrusion, the steel of the bucket surface is hardened.

The end of the bucket surface may be provided with teeth, which may be formed or arranged on it.

The handle has an ergonomic shape and because of the shape of the bucket it is fixed in its ergonomic position on the arm. The arm may be optionally slidable and/or tiltable, i.e. the position of the arm with respect to the bucket may be modified.

The hand digging shovel according to the present invention is easy to handle, resistant and ergonomically shaped. It allows for an excellent leverage, which, even in very tight spaces, permits a reduced effort, low fatigue and effective digging. The excavation may be minimized, so that only very small quantities of additional excavation material are formed, and this means that non oblique or collapsing wall sections are formed. Both cylindrical holes and ditches may be excavated in a short time and with reduced effort. The filling degree or excavating volume per stroke is very high, even with a very flowable excavation material, for instance sand.

Figure 2:
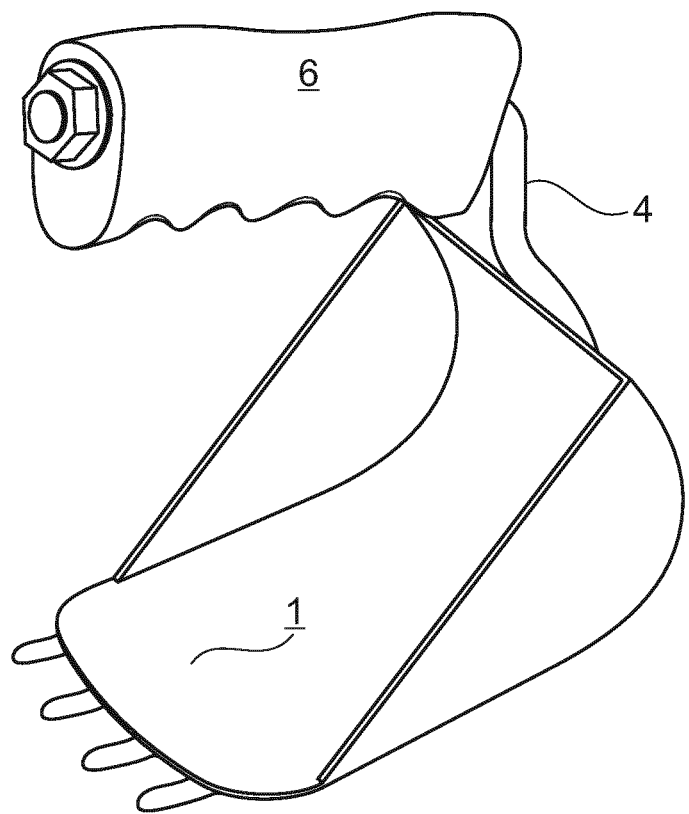

The invention is clarified in the following in greater detail by means of description of an exemplary embodiment depicted in the drawings. In the drawings FIG. 1 shows a hand digging shovel, FIG. 2 shows a further view of the hand digging shovel.

The hand digging shovel according to the present invention comprises a bucket 1 connected to an arm 4, and a handle 6 provided on the arm 4, wherein handle 6 and bucket 1, i.e. an axis 9 of the bucket 1 and an axis 10 of the handle 6 have a slightly V-shaped arrangement relative to one another. The aperture angle corresponds to approximately 70°-80°, although it is always definitely less than 90°.

The bucket surface 2 of bucket 1 is curved, although it is provided with a substantially straight end portion towards the exit. Parallel side walls 3 of bucket 1 are approximately perpendicular to the bucket surface 2 and are shorter than the bucket surface 2, so that the bucket surface 2 has a protruding portion 11. The straight section or portion of the bucket surface 2 already begins within the side walls 3.

The bucket surface 2 may be slightly curved or even planar towards the side walls 3, but for the sake of stability, it remains curved in the transversal direction.

Bucket 1 and arm 4 are formed of cold formed steel and at least in the area of the protrusion (protruding portion) 11, the steel of the bucket surface 2 is hardened. Bucket surface 2 and side walls 3 are welded. The arm 4 is also welded to the bucket surface 2, and the handle shell 7 is welded to the arm 4.

The end portion of bucket surface 2 may be provided with welded teeth 5, which extend up to beneath the termination (end portion) of the side walls, therefore clearly reducing the bending tendency (the attitude to bend) of the bucket plate.

The handle 6 is made of wood and has an ergonomic shape, wherein the thumb of the gripping hand is preferably directed toward the arm 4. Due to the shape of the handle shell 7, the handle 6 is firmly fixed and kept in its position. Through releasing a fastening element 8 it is possible to modify the position of the handle 6 or to replace the handle 6 for different hand sizes or for lefthanders, optionally through a not shown arm extension.

The arm 4 may be optionally adjustable and/or tiltable and is preferably angled in order to achieve an optimal reciprocal disposition of handle 6 and bucket 1.

The described hand digging shovel is not limited to the embodiment shown. It is a universal tool, which may be at the same time a shovel, a spade and a hoe. It is useful for excavating long holes or long narrow ditches, for instance for cables or water lines. The depth of the ditch may reach arm's length.

When the shovel is held upside down, it is also useful for throwing material.

LIST OF REFERENCE NUMERALS 1 bucket
2 bucket surface
3 side wall
4 arm
5 tooth
6 handle
7 handle shell
8 fastening element
9 bucket axis
10 handle axis
11 protrusion

The invention claimed is:

1. A hand digging shovel, comprising:
a shovel plate or a shovel bucket; and
a handle having a transition portion connected to the shovel plate or the shovel bucket, the transition portion including an arm;
wherein the handle and the shovel plate or the shovel bucket have a slightly V-shaped arrangement or disposition relative to one another;
wherein the shovel plate or the shovel bucket has a curved bucket surface that is delimited by side walls and extends between the side walls, the curved bucket surface has a substantially straight end portion in a longitudinal direction towards an exit of the shovel plate or shovel bucket, and retains a curvature thereof in a transverse direction;
wherein the straight end portion of the curved bucket surface includes a protruding portion that extends beyond the side walls and is not part of the side walls;
wherein substantially an entirety of each of the side walls is substantially flat;
wherein the side walls are substantially perpendicular to the curved bucket surface; and
wherein the straight end portion of the curved bucket surface is provided with teeth welded thereto, the teeth extending up to beneath a termination of the side walls.

2. The hand digging shovel according to claim 1 wherein the shovel plate or the shovel bucket defines a first axis and the handle defines a second axis, with the first and second axes orientated relative to each other in a V-shaped arrangement.

3. The hand digging shovel according to claim 2 wherein the first and second axes define an aperture angle that is less than 90°.

4. The hand digging shovel according to claims 1 to 3 wherein the handle has an ergonomic shape and includes a handle shell configured for selectively fixing and repositioning the handle on the arm.

5. The hand digging shovel according to claim 1 wherein the side walls are approximately parallel to each other.

6. The hand digging shovel according to claim 1 wherein the side walls are approximately perpendicular relative to the curved bucket surface.

* * * * *